(12) United States Patent
Ranjan et al.

(10) Patent No.: US 11,823,488 B1
(45) Date of Patent: Nov. 21, 2023

(54) SYSTEM FOR TRAINING EMBEDDING NETWORK

(71) Applicant: AMAZON TECHNOLOGIES, INC., Seattle, WA (US)

(72) Inventors: Rajeev Ranjan, Seattle, WA (US); Manoj Aggarwal, Seattle, WA (US); Gerard Guy Medioni, Los Angeles, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 205 days.

(21) Appl. No.: 17/215,762

(22) Filed: Mar. 29, 2021

(51) Int. Cl.
*G06V 40/12* (2022.01)
*G06N 3/08* (2023.01)
*G06V 40/13* (2022.01)

(52) U.S. Cl.
CPC .......... *G06V 40/1365* (2022.01); *G06N 3/08* (2013.01); *G06V 40/1318* (2022.01)

(58) Field of Classification Search
CPC .......... G06V 40/1365; G06V 40/1318; G06V 10/82; G06N 3/08
See application file for complete search history.

(56) References Cited

U.S. PATENT DOCUMENTS

2015/0010215 A1* 1/2015 Fukuda ................ G06V 40/145 382/115
2015/0310272 A1* 10/2015 Wang .................... G06V 40/19 348/78
2019/0392189 A1* 12/2019 Kumar ................... G06N 3/045
2021/0406510 A1* 12/2021 Kazdaghli ............... G06N 3/08

OTHER PUBLICATIONS

Hollemans, Matthijs, "MobileNet versions 2", 8 pages. Retrieved from the Internet: URL: https://machinethink.net/blog/mobilenet-v2/.
Sandler, et al., "Inverted Residual Block", 2 pages. Retrieved from the Internet: URL: https://www.paperswithcode.com/method/inverted-residual-block.
Sandler, et al., "MobileNetV2: Inverted Residuals and Linear Bottlenecks", Google Inc., aeXiv:1801.04381v4 [cs.CV] Mar. 21, 2019, 14 pages. Retrieved from the Internet: URL: https://arxiv.org/pdf/1801.04381.pdf.

(Continued)

*Primary Examiner* — Edward F Urban
*Assistant Examiner* — Wassim Mahrouka
(74) *Attorney, Agent, or Firm* — Lindauer Law, PLLC

(57) ABSTRACT

Biometric input, such as an image of a hand, may be processed to determine embedding vector data that may be used to identify users. Accuracy of the identification is improved by using high resolution inputs to a deep convolutional neural network (DCNN) that is trained to generate the embedding vector data that is representative of features in the input. Training data sets are expensive to develop and thus may be relatively small. During training of the DCNN, confidence loss values corresponding to the entire input as well as particular patches or portions of the input are determined. These patch-wise confidence loss values mitigate potential overfitting during training of the DCNN and improve overall performance of the trained DCNN to determine embedding vector data suitable for identification.

20 Claims, 7 Drawing Sheets

(56) References Cited

OTHER PUBLICATIONS

Sandler, et al., "MobileNetV2: The Next Generation of On-Device Computer Vision Networks", Google AI Blog, Apr. 3, 2018, 2 pages. Retrieved from the Internet: URL: https://ai.googleblog.com/2018/04/mobilenetv2-next-generation-of-on.html.

Shi, et al., "Towards Universal Representation Learning for Deep Face Recognition", CVPR 2020, Open Access, pp. 6817-6826. Retrieved from the Internet: URL: https://openaccess.thecvf.com/content_CVPR_2020/papers/Shi_Towards_Universal_Representation_Learning_for_Deep_Face_Recognition_CVPR_2020_paper.pdf.

\* cited by examiner

SYSTEM FOR TRAINING EMBEDDING NETWORK

BACKGROUND

Biometric data may be used for recognition of an individual.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
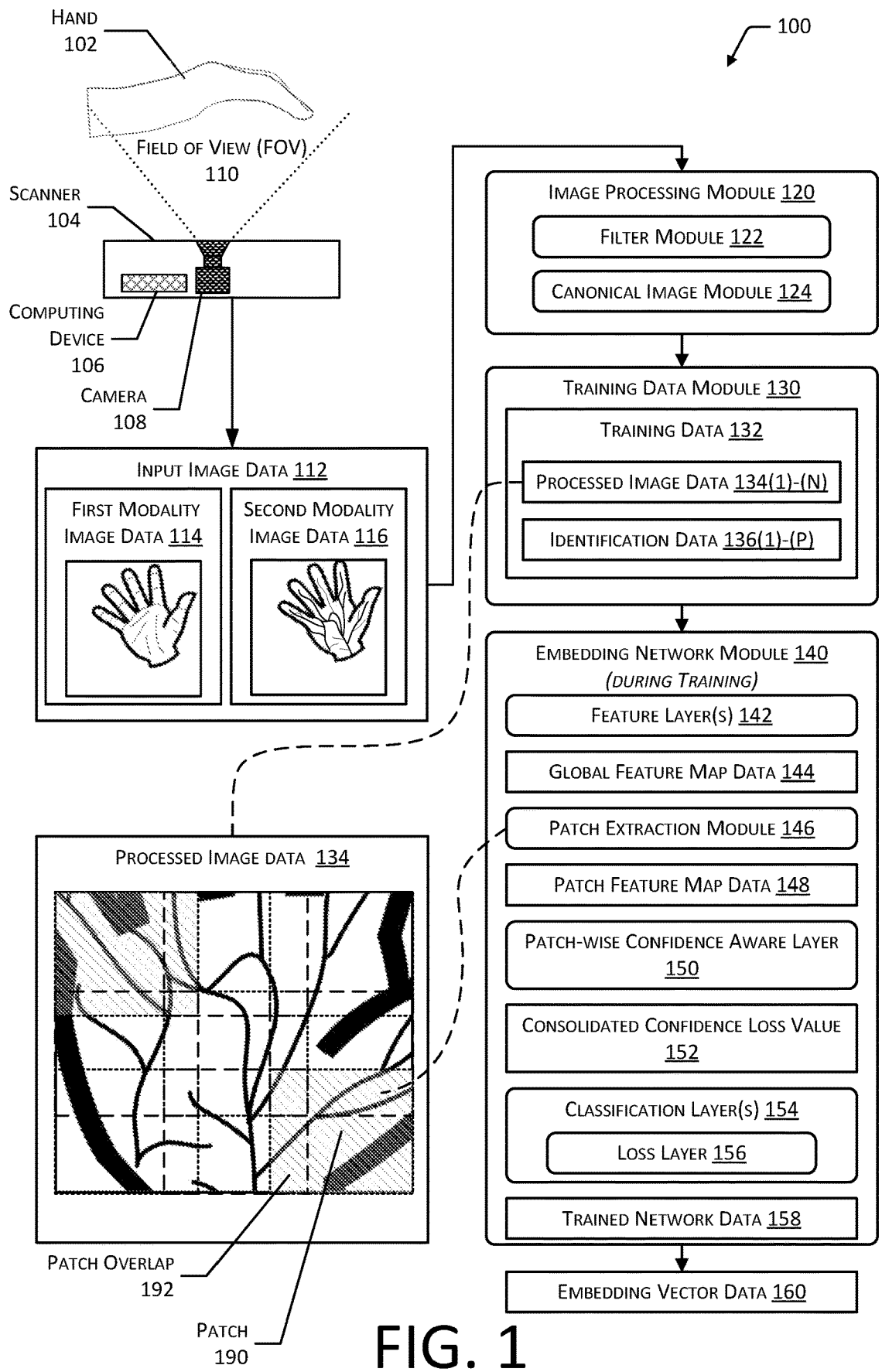
FIG. 1 illustrates a system to train an embedding network module to determine embedding vector data that is representative of features present in an image that are suitable for identification, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast biometric identification of a user may be used in a variety of ways. For example, entry to a materials handling facility (facility), office, transportation facility, or other location may be controlled based on user identity. As the user enters the facility, the user may be identified using the devices and techniques described herein. In another example, a point-of-sale system may use the devices and techniques described herein to identify a user and determine a payment account to be used for goods or services.

Traditional systems for identifying users suffer from several significant drawbacks, including susceptibility to fraud, lack of speed, inaccuracy, and operational limitations. For example, a traditional system to identify a user by presenting a token, such as an identification card, may be used by someone other than an authorized user. As a result, systems that involve only the use of "something you have" are vulnerable to misuse. Biometric identification deals with this by using a characteristic of the particular individual that is considered difficult or impossible to copy or be transferred.

Described in this disclosure is an embedding network that has been trained using biometric data as input and that provides output representative of features of the biometric data. For example, a trained embedding network may input image data from a scanner and provides output that is representative of features of biometric data indicated by the image data. The image data may be biometric data associated with a person's hand. The output may be in the form of embedding vector data. The embedding network may comprise a convolutional neural network (CNN) that includes a plurality of feature layers, a patch-wise confidence aware layer, and loss layer(s). During training, a loss function is used to determine the values of various parameters within the neural network, such as weights associated with particular nodes within the layers. Trained network data comprises these values. As a result of the training, the embedding vector data produced is particularly suited to represent features present in the input that distinguish one user from another.

Once training is completed, the embedding network with parameters set using the trained network data is used to determine embedding vector data representing an embedding vector. This is known as "inference". For example, to generate query embedding vector data, a query image of an unidentified user's hand may be processed by the embedding network that implements the trained network data. This query embedding vector data may be compared to previously stored embedding vector data that is associated with previously enrolled users. If the query embedding vector data and the previously stored embedding vector data are determined to be sufficiently similar, the identity of the previously enrolled user may be asserted to the unidentified user.

Training of the embedding network is performed using training data. The training data may comprise actual or synthetic input that has been previously labeled. For example, three different images of the right hands of 1,000 different users may be acquired, producing training data that includes 3,000 images. Each image is known to belong to a particular person and is labeled accordingly. The set of training data includes the images and the associated labels. During training, the set of training data is provided as input and a "loss function" that generates a "loss value" that represents feedback regarding whether, based on the labels, the output from the embedding network is correct or incorrect. For example, the embedding vectors for images of two different hands should be different enough to reliably distinguish that the hands do not belong to the same person, as indicated by the labels. The loss value may be used to change the operation of the embedding network during the next iteration of training. During subsequent iterations, the embedding network may improve how accurately different users are distinguished, as the various weights for the nodes change responsive to the loss function/value feedback.

Sets of training data are expensive to construct and maintain. Continuing the earlier example, to obtain the above set of training data, 1,000 different users would need to present their hands to a scanner and the data would need to be acquired, labeled, and otherwise processed. This requires time, incurs cost, and does not scale well. The set of training data may include synthetic data, but this too incurs a cost to produce. Neural networks typically rely on very large sets of training data to provide results with a desired level of accuracy. In general, as the set of training data increases, the better the trained network will perform.

If the set of training data is too small, the neural network will suffer from "overfitting" errors. Overfitting results when the neural network has only learned how to distinguish between examples in the set of training data, and as a result performs poorly when provided with new inputs. Traditionally, overfitting errors are mitigated by enlarging the set of training data. However, as mentioned, this is time intensive and costly and may not be feasible.

Overfitting errors can become even more acute as the dimensionality (or resolution) of the input increases without increasing the size of the data set. For example, increasing the resolution of an input image to a neural network from 112×112 pixels to a higher resolution such as 512×512 or 768×896 pixels without increasing the size of the set of training data will result in overfitting and a poorly trained neural network. As mentioned earlier, enlarging the set of training data may be infeasible.

Instead of enlarging the training set, another approach to addressing overfitting is to break the input into smaller sections, such as sub-images, and train and process each separately. This produces feature vector data for each section. The feature vector data for each section is then combined to produce overall feature vector data representative of the input. However, this results in a dimensional size of the overall feature vector that increases linearly with the number of sections used. As a result, the computational requirements, memory requirements, latency, and so forth are increased during both training and inference. During training, this increase may limit the size of the set of training data due to available memory needed to process those sections and their relatively large feature vectors. During inference, operation of the resulting trained neural network may also require additional computational resources that exceed the capabilities available in resource constrained devices, such as mobile devices, point of sale devices, and so forth.

This disclosure describes systems and techniques for training an embedding network with an architecture that mitigates overfitting while avoiding the increase in feature vector dimensionality. A feed forward neural network, such as a convolutional neural network, includes a patch-wise confidence aware layer and associated consolidated confidence loss value that is used in the loss function during training. During training of the neural network, one or more feature layers produce a global feature map. The global feature map represents features present in the input that have been processed by the intervening layers, such as by filtering, convolution, and so forth. The global feature map may be subdivided into patches or portions. A first patch may comprise the entire global feature map. A second patch comprises a first portion of the global feature map. A third patch comprises a second portion of the global feature map, and so forth. For example, ten patches may be used: the first patch representing the entire global feature map, and nine patches representing respective portions of the global feature map. The patches may overlap. For example, each patch may have a dimensionality that is one-half the dimensionality of the global feature map. Each patch may be offset relative to other patches, with respect to the global feature map.

Confidence loss values are determined for each patch and combined to produce a consolidated confidence loss value. For example, a weighted sum of the confidence loss values may be used to calculate the consolidated confidence loss value. The consolidated confidence loss value may then be provided to a loss layer. This provides a patch-wise confidence aware loss function. During training, this patch-wise confidence aware loss function has the effect of providing greater emphasis to patches with higher quality data, while decreasing the emphasis of patches with lower quality data. In essence, the patch-wise confidence aware loss function allows the network to learn which patches in the feature map will provide information that informs embedding vector data that is better at distinguishing different users.

By using the patch-wise confidence aware loss function in this architecture, higher resolution biometric input may be used without necessitating a larger set of training data while avoiding overfitting. This reduces the costs associated with creating and maintaining a set of training data. The increase in the size of the embedding vector data during processing is also avoided. The resulting improvements produce a reduction in identification errors, substantially improving performance during usage. For example, use of the architecture described in this disclosure decreased identification errors by more than five times compared to a baseline architecture. As a result, the system provides a highly reliable assertion of identification based on biometric input.

Illustrative System

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112 obtained using two or more modalities. The scanner 104 may include other components which are not shown. For example, the scanner 104 may include lights that illuminate the object in the FOV 110.

In the implementation depicted, the hand 102 is held above the camera 108, with the FOV 110 extending upward. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. In other implementations, other configurations may be used. For example, the camera 108 may have the FOV 110 extending downwards, and the user may place their hand 102 in the FOV 110 under the scanner 104.

The scanner 104 may acquire images of the hand 102 using one or more modalities. A first modality may acquire images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include creases, wrinkles, scars, dermal papillae ridges, and so forth in at least the epidermis of the hand 102.

Second modality features comprise those features that are below the epidermis. The second modality may acquire images in which the hand 102 is illuminated with light having a second polarization and obtained by the camera 108 with the polarizer passing light to the camera 108 with the first polarization. For example, the second modality features may include anatomical structures such as veins, bones, soft tissue, or other sub-surface features. Some features may be visible in both first modality and second modality images. For example, a crease in the palm may include first modality features on the surface as well as deeper second modality features within the palm.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same image may be acquired in rapid succession with respect to one another. For example, the camera 108 may operate at 60 frames per second and acquire the first modality image data 114 in a first frame and the second modality image data 116 in a second frame.

The user may place their hand 102 within the FOV 110 in various poses, distances, translations, and so forth. While in the FOV 110, the hand 102 may move as well. The pose of the hand 102 may indicate the rotation of the hand 102 relative to the camera 108 and the articulation of the joints in the hand 102. For example, the pose may be that the hand 102 is rotated with a yaw of −2 degrees, pitch of +5 degrees, and roll of −7 degrees and an articulation in which the fingers are together. The distance may comprise the distance between the camera 108 and the hand 102. For example, the distance may vary from zero in which the hand 102 is in contact with the scanner 104 to several meters in which the hand 102 may be too far away for a useful image to be acquired. The translation indicates the translation or apparent position of the hand 102 in a plane that is perpendicular to an optical axis extending away from the camera 108. For example, if the hand 102 is not centered directly above the camera 108, the resulting input image data 112 may show the hand 102 to be translated away from the center of the input image.

In the implementation depicted here, the scanner 104 does not include a guide, scan plate, or other structure that constrains the pose or position of the hand 102. For example, the user may move their hand 102 within the FOV 110 freely, rotating, translating, changing articulation, and so forth without constraint. As a result, the appearance of the hand 102 in the input image data 112 may vary due to changes in articulation, pose, distance, translation, and so forth.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image. However, even in the situations involving the guide, the user 102 may not be fully constrained. For example, the user may place their hand 102 in different articulations such as fingers together, fingers apart, and so forth. The user may also fail to place their hand 102 in the preferred position with regard to the guide, for example only having an edge of their hand 102 in contact with the scan plate while the rest is elevated producing a rotation of the hand 102 with respect to the camera 108. As a result, the input image data 112 may vary considerably, even with the structure to guide the user's hand 102.

In other implementations the input image data 112 and the system 100 may utilize biometric information about other features of the user. For example, the input image data 112 may comprise images of the user's face, ears, overall image of the user, and so forth.

An image processing module 120 may receive the input image data 112 and perform additional processing. For example, a filter module 122 of the image processing module 120 may apply one or more filters to the input image data 112. In another example, the image processing module 120 may align the first modality image data 114 and the second modality image data 116. This alignment may include one or more of rotation or translation of a portion of the images.

In some implementations the image processing module 120 may generate multimodal image data (MMID). Data from two or more modality images may be combined into a single image to produce the MMID. For example, the first modality image data 114 and the second modality image data 116 may each comprise grayscale images. The multimodal image module may combine the two images to generate the MMID. For example, first grayscale data from the first modality image data 114 may be stored as a first channel of the MMID while second grayscale data from the second modality image data 116 may be stored as a second channel of the MMID.

The image processing module 120 may comprise a canonical image module 124. For example, the canonical image module 124 may accept as input the input image data 112 and provide as output canonical image data. In some implementations the canonical image module 124 may comprise a neural network that has been trained to generate canonical image data as output. The canonical image data represents the input image data 112 with one or more of a predetermined pose relative to the camera 108 of the scanner 104, predetermined articulation of the hand 102, predetermined illumination, predetermined scale, or other characteristic. For example, the input image data 112 may depict the hand 102 of the user slightly tilted and off-center relative to the FOV 110, with the fingers together. In another example, the input image data 112 may depict the hand 102 of the user only filling a portion of the image. By scaling the input image data 112, the hand 102 may appear to be a predetermined with within the image. The canonical image data may depict the same hand in a canonical pose with no tilt and centered in the image, a canonical articulation in which the fingers are splayed apart, with the hand filling the image frame and so forth.

The image processing module 120 provides as output processed image data 134. A training data module 130 may be configured to provide a set of training data 132. The training data 132 may comprise the processed image data 134(1), 134(2), . . . , 134(N) and associated labels such as identification data 136(1), 136(2), . . . , 136(P). For example, users who have opted in to participate in providing information for the training data 132 may present their hands 102 at the scanner 104. Input image data 112 may be acquired of their hands 102. The identification data 136 may comprise an actual identification indicative of a real identity, or an arbitrarily assigned unique identifier that distinguishes one user from another. For example, processed image data 134(1)-134(61) may comprise images of the hand 102(1) of a first user that are associated with identification data 136(1) having a randomly assigned unique value of "686769726c69766963". Continuing the example, processed image data 134(62)-134(150) comprising images of the hand 102(2) of a second user are associated with identification data 136(2) having a value of "746f6e79737461726b".

The training data 132 is used by the embedding network module 140 during training. In general, the greater the number of images in the set of training data 132, the better the trained embedding network module 140 will perform. The training data 132 may comprise input that has been labeled. For example, three different images of the right hands of 1,000 different users may be acquired, producing training data that includes 3,000 images. Each image is known to belong to a particular person and is labeled accordingly. The set of training data 132 includes the images and the associated labels. During training, the set of training data 132 is provided as input and a loss function generates a loss value that is used to train the neural network.

Sets of training data 132 are expensive to construct and maintain. Continuing the earlier example, to obtain the above set of training data 132, 1,000 different users would need to present their hands to a scanner 104 and the data would need to be acquired, labeled, and otherwise processed. This requires time, incurs cost, and does not scale well. The set of training data 132 may include synthetic data, but this too incurs a cost to produce.

If the set of training data 132 is too small, the neural network will suffer from "overfitting" errors. Overfitting results when the neural network has only learned how to distinguish between examples in the set of training data 132, and as a result performs poorly when provided with new inputs. Traditionally, overfitting errors are mitigated by enlarging the set of training data 132. However, as mentioned, this is time intensive and costly and may not be feasible.

Overfitting errors can become even more acute as the dimensionality (or resolution) of the input increases without increasing the size of the data set. For example, increasing the resolution of an input image to a neural network from 112×112 pixels to a higher resolution such as 512×512 or 768×896 pixels without increasing the size of the set of training data 132 will result in overfitting and a poorly trained neural network. As mentioned earlier, enlarging the set of training data 132 may be infeasible.

During training, the training data 132 comprising the processed image data 134 and identification data 136 or other labels is provided to an embedding network module 140. The embedding network module 140 may comprise a deep learning system, such as a convolutional neural network (CNN). The embedding network module 140 may be operated in several modes, such as training and inference. The embedding network module 140 during training is depicted in FIG. 1. The embedding network module 140 may implement a feed forward neural network. In one implementation, the embedding network module 140 may implement the MobileNetV2 architecture as a backbone, modified as described herein. The embedding network module 140 may include one or more feature layers 142 that may be used to produce global feature map data 144. The feature layers 142 may comprise one or more layers to perform operations such as convolution functions, activation functions, pooling functions, and so forth. The architecture of the embedding network module 140 is discussed in more detail with regard to FIG. 3.

The global feature map data 144 is based on processing of an input, such as the processed image data 134 from the training data 132. The global feature map data 144 may be representative of one or more features of the input as extracted by the feature layers 142.

During training, the embedding network module 140 comprises a patch extraction module 146. The patch extraction module 146 determines a set of patches that includes an overall or global patch comprising the entire global feature map data 144 and a set of patches that each comprise a portion of the global feature map data 144. Each patch 190 in the set of patches comprises at least a portion of the global feature map data 144 that corresponds to the associated at least a portion of the processed image data 134 that is provided as input. This correspondence is depicted in FIG. 1, where the processed image data 134 is shown with nine patches 190. In one implementation, each of the patches that correspond to portions of the global feature map data 144 may be the same size. In another implementation, the size of respective patches may vary.

A tenth patch comprising the global feature map data 144 is not shown. With the exception of the global patch, the remaining patches 190 in the implementation shown may exhibit some patch overlap 192. For example, a first patch 190(1) may overlap a second patch 190(2), such that each patch 190 contains at least some of the same feature map data as at least one other patch 190. In another implementation, remaining patches 190 do not overlap. The patch extraction module 146 provides, during training, patch feature map data 148 that comprises the portion of the global feature map data 144 that is associated with the respective patch 190.

The embedding network module 140 includes a patch-wise confidence aware layer 150. The patch-wise confidence aware layer 150 accepts as input the patch feature map data 148 and provides as output a consolidated confidence loss value 152. These operations are discussed in more detail in FIGS. 3-4.

The embedding network module 140 may include one or more classification layers 154, such as a loss layer 156. The loss layer 156 utilizes a loss function as described below with regard to FIG. 3 that takes into consideration the consolidated confidence loss value 152.

During training, the embedding network module 140 processes at least a portion of the training data 132 to determine trained network data 158. The trained network data 158 may comprise one or more of weights that are associated with individual nodes within one or more of the feature layers 142, the classification layers 154, and so forth. For example, the trained network data 158 may comprise information indicative of relative weights to be assigned to specific nodes within the feature layers 142. The output from the embedding network module 140 is embedding vector data 160. The embedding vector data 160 comprises information that is representative of one or more features of the input to the embedding network module 140.

The training process produces trained network data 158 that results in the embedding network module 140 providing embedding vector data 160 that provides information that may be used to distinguish one user from another, based on the input data. By using the patch-wise confidence aware layer 150 as described herein, the set of training data 132 may be relatively small while avoiding overfitting. Once trained, the trained network data 158 may be provided to other devices to perform inference, generating embedding vector data 160 representative of query input, such as an image of the hand 102 of a user that is to be identified. Operation during inference is discussed with regard to FIG. 2.

By using the techniques and architecture described in this disclosure, a neural network may be trained using a relatively small set of training data 132 to produce embedding vector data 160 suitable for distinguishing one user from another. The reduction in the needed size of the training data 132 reduces initial and ongoing costs. The embedding vector data 160 may then be used to assert an identity to a previously enrolled user. A substantial improvement in the embedding vector data 160 produced by a neural network trained as described herein also results in substantial increases in the overall accuracy of the asserted identity. This provides substantial benefits to users of the system.

Figure 2:
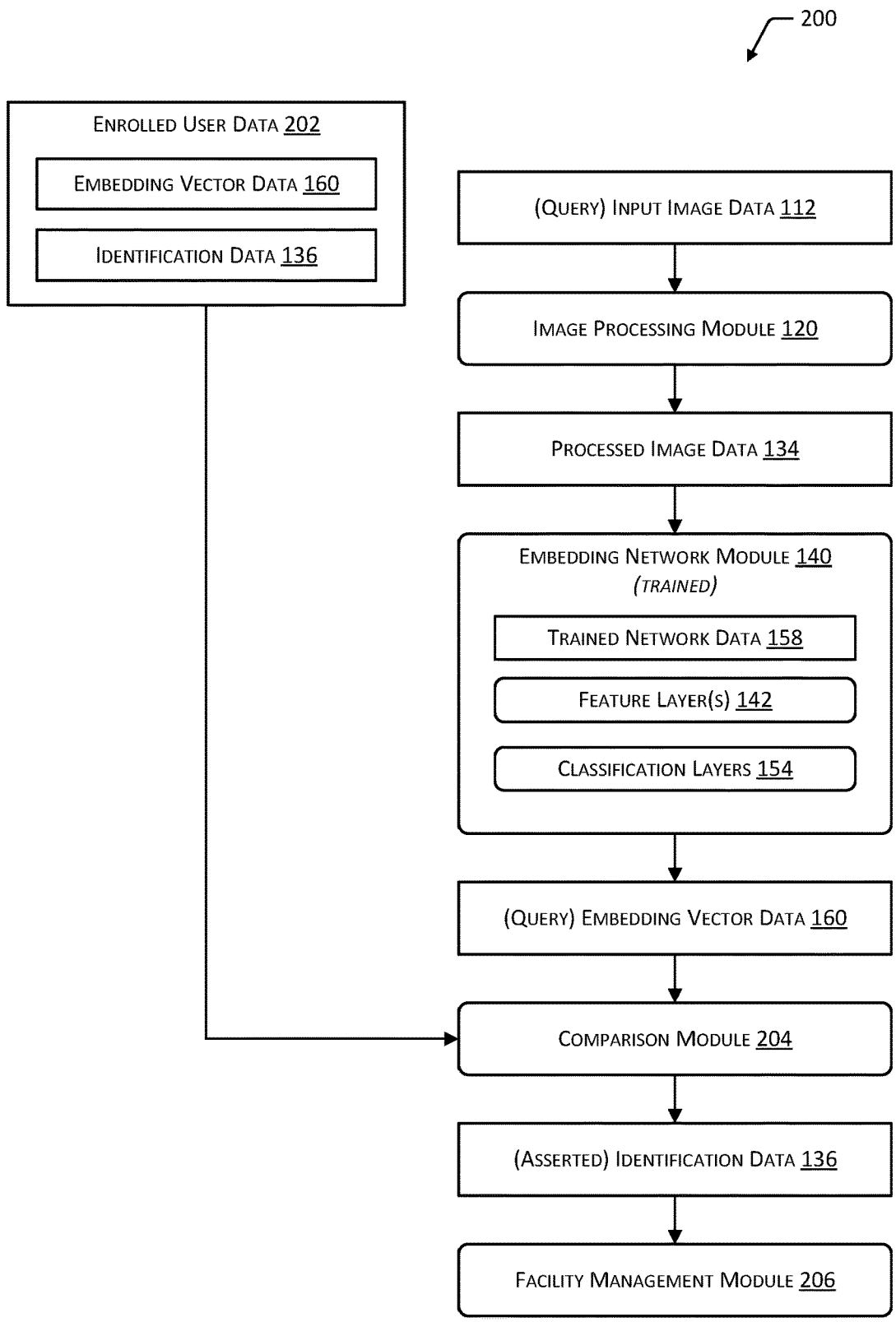
FIG. 2 illustrates use of the trained embedding network, according to some implementations.

FIG. 2 illustrates a system 200 that uses the trained embedding network module 140 of FIG. 1, according to some implementations. Once training is complete, the embedding network module 140 may comprise the feature layers 142 and the classification layers 154, with one or more parameters thereof specified by the trained network data 158. For example, the trained network data 158 may comprise weight values specifying weights to be associated with one or more nodes or neurons within the feature layers 142. While operating in an inference mode, query input is provided and the system 200 attempts to determine if that query input corresponds to a previously enrolled identity.

During an enrollment process, the user may opt in to use the system 200 and presents their hand 102 to produce input image data 112. Enrolled user data 202 may be stored that comprises one or more of the processed image data 134, associated embedding vector data 160, identification data 136, and may include additional information. The identification data 136 may comprise a name, government issued identification value, assigned identification value, or other information. The additional information may comprise name, contact information, demographic data, payment account information, and so forth. The embedding vector data 160 may act as a "signature" that is uniquely associated with the identity of the user. During the enrollment process, a comparison module 204 may be used to determine whether the user has been previously enrolled.

During subsequent usage, the (as yet unidentified) user presents their hand 102 at a scanner 104. The resulting input image data 112 may be processed by the image processing module 120 to determine processed image data 134. For example, the processed image data 134 may comprise a canonical version of the query input image data 112. The processed image data 134 is then provided as input to the trained embedding network module 140.

The trained embedding network module 140 processes the processed image data 134 and provides as output query embedding vector data 160. The query embedding vector data 160 is then provided to a comparison module 204. The comparison module 204 compares the query embedding vector data 160 to the embedding vector data 160 stored in the enrolled user data 202 to determine asserted identification data 136. In one implementation, the asserted identification data 136 may comprise a user identifier associated with the closest embedding vector data 160 in the enrolled user data 202 to the query embedding vector data 160 associated with the user who presented their hand 102.

The comparison module 204 may determine distances between the point in a vector space that is associated with the query embedding vector 160 for the user to be identified and points associated with other embedding vectors represented in the enrolled user data 202. In one implementation, the comparison module 204 may assert the identity that corresponds to the embedding vector data 160 of a previously enrolled user that is closest in vector space to the query embedding vector data 160. Other thresholds and comparison may be used in some implementations.

The identification data 136 may provide information such as one or more of a user identifier associated with the user, a location or identification of the scanner 104, data indicative of date and time that the input image data 112 was obtained, and so forth. The asserted identification data 136 may be subsequently used for various purposes. In some implementations, the asserted identification data 136, or information associated with the asserted identification data 136, may be provided to another system, such as a facility management module 206. For example, if the user has been granted access to the facility, the facility management module 206 may issue a command to open a gate or door so the user may enter the facility. In another example, the identification data 136 may be used to determine a payment account or other credentials associated with the user which may then be used in a financial transaction. In yet another example, the identification data 136 may be passed to a facility management module 206.

The facility management module 206 may use the identification data 136 to associate an identity with that user as they move about the facility. For example, the facility management module 206 may use data from cameras or other sensors in the environment to determine a location of the user. Given a known path of the user from the gate, the user identity indicated in the identification data 136 may be associated with the user as they use the facility. For example, the now identified user may walk to a shelf, remove an item, and leave the facility. The facility management module 206 may determine the interaction data indicative of the removal of the item as being associated with the user identifier specified in the identification data 136, and bill an account associated with the user identifier.

The systems and techniques described above are discussed with respect to images of human hands. These systems and techniques may be used with respect to other forms of data, other kinds of objects, and so forth. For example, the input image data 112 may be of faces, overall body of the user, and so forth. In some implementations the system may be used to identify different entities. For example, the system may be used to identify animals such as pets, service animals, and so forth.

Figure 3:
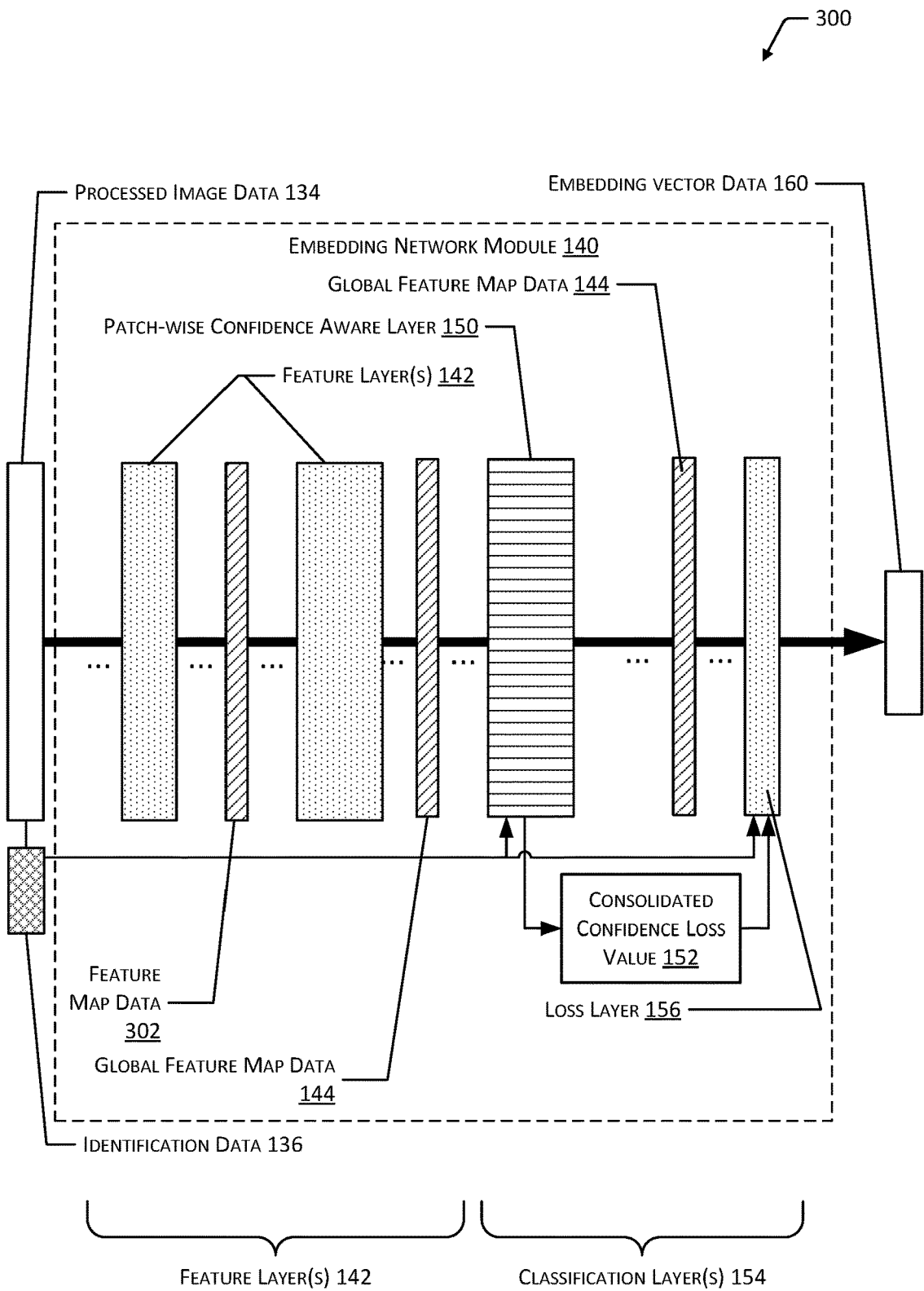
FIG. 3 is a block diagram of a portion of a neural network that uses patch-wise confidence aware loss values during training, according to some implementations.

FIG. 3 is a block diagram 300 of a portion of a neural network as implemented by the embedding network module 140 that uses patch-wise confidence aware loss values during training, according to some implementations. The processed image data 134 and associated identification data 136 or other labels are provided as input to the neural network during training. The neural network may comprise a convolutional neural network with a plurality of layers including one or more feature layers 142, the patch-wise confidence aware layer 150, and one or more classification layers 154 including a loss layer 156.

In some implementations, the neural network may comprise a feed forward neural network. A feed forward neural network provides information from earlier layers and the nodes therein to later or subsequent layers and the nodes therein. In one implementation the neural network may utilize the MobileNetV2 architecture. (See "MobileNetV2: Inverted Residuals and Linear Bottlenecks", Sandler, M. et al, 2018 IEEE/CVF Conference on Computer Vision and Pattern Recognition, 18-23 Jun. 2018.)

The feature layers 142 may comprise one or more convolution layers (not shown) that perform a convolution operation on data that is provided as an input to the respective layer. For example, the processed image data 134 may be processed by one or more convolution layers. Output from the convolution layers may be combined by a pooling layer. The convolution layer may include an activation function, such as a rectified linear unit. The convolution layer(s) may serve to extract information about features corresponding with the data at that layer. The pooling layer may have various results, such as reducing the spatial size of the extracted information from the convolution layer, decreasing noise, and so forth. Output from a feature layer 142 may comprise feature map data 302. The feature map data 302 comprises information about the features as extracted by the respective featured layer 142. The quantity and arrangement of the layers are shown for illustration only, and not necessarily as a limitation. For example, additional or other layers may be present.

Figure 4:
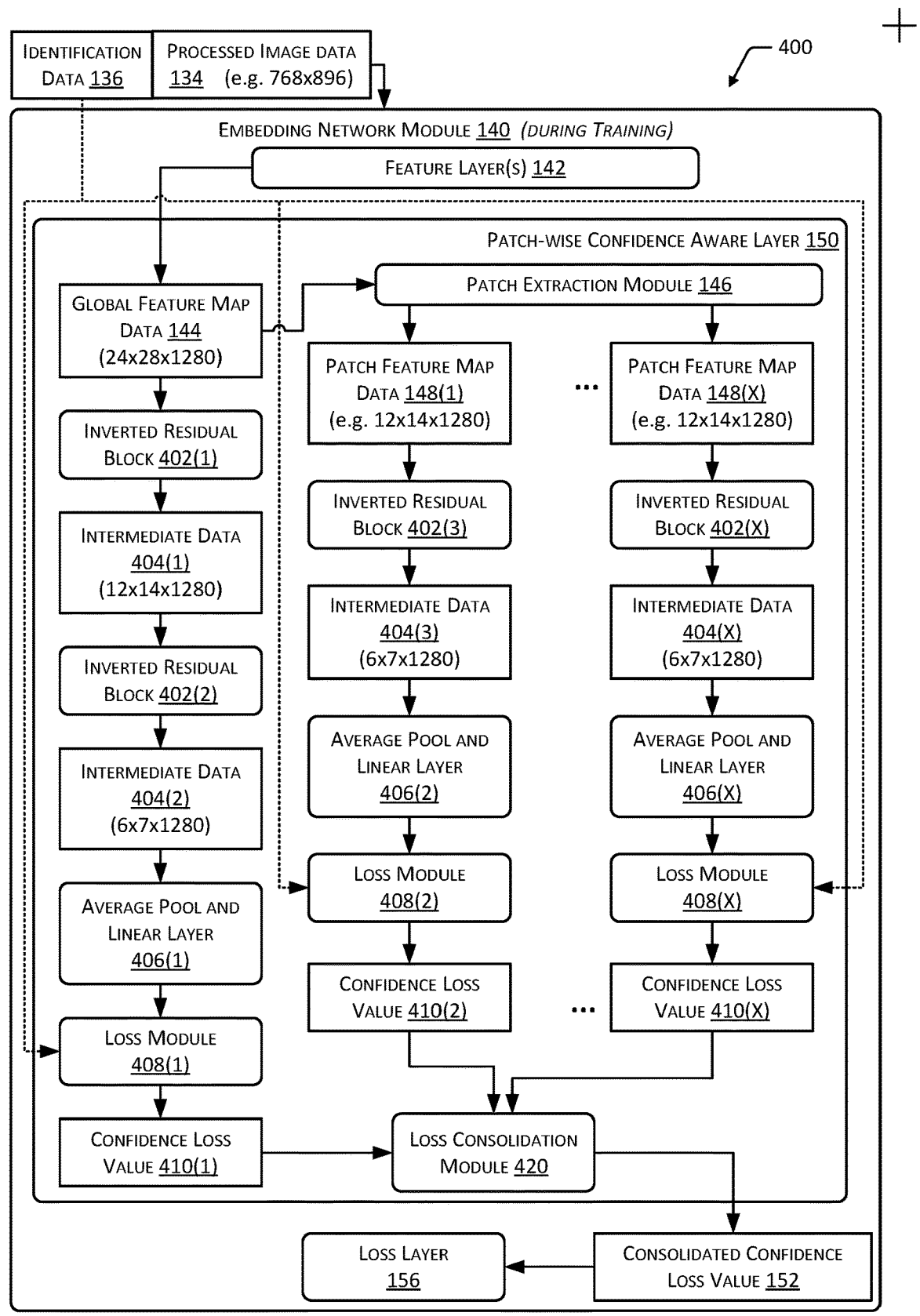
FIG. 4 is a block diagram of a portion of the neural network of FIG. 3 that uses patch-wise confidence loss values, according to some implementations.

As described in more detail with regard to FIG. 4, the patch-wise confidence aware layer 150 processes the global feature map data 144 to determine patch feature map data 148 (not shown in FIG. 3) and the consolidated confidence loss value 152. The resulting consolidated confidence loss value 152 from the patch-wise confidence aware layer 150 is provided to the loss layer 156. Identification data 136 or other labels that are associated with the processed image data 134 being processed may be provided to the patch-wise confidence aware layer 150. FIG. 4 is a block diagram 400 of a portion of the neural network of FIG. 3 that uses patch-wise confidence loss values, according to some implementations. The processed image data 134 may comprise a greyscale image having a resolution such as 256×256, 512×512, 768×896 pixels (width×height), or another value. Identification data 136 or other label information is associated with the processed image data 134. The feature layer(s) 142 may determine the global feature map data 144. The global feature map data 144 is representative of the input, such as the processed image data 134. The dimensionality of the global feature map data 144 may differ from the resolution of the input to the embedding network module 140. For example, the global feature map data 144 may have a dimensionality of 24×28×1280. The patch-wise confidence aware layer 150 operates on a set of patches, each patch comprising at least a portion of the of the global feature map data 144. In one implementation, the set of patches may comprise a global patch comprising the entire global feature map data 144, and a plurality of patches that each are a portion of the global feature map data 144.

The global feature map data 144, representing the global patch, is processed by a pair of inverted residual blocks 402. A first inverted residual block 402(1) processes the global feature map data 144 and determines first intermediate data 404(1). Continuing the example, with the global feature map data 144 having a dimensionality of 24×28×1280, the first intermediate data 404(1) may have a dimensionality of 12×14×1280. The first intermediate data 404(1) is then processed by a second inverted residual block 402(2) to determine second intermediate data 404(2). Continuing the example, the second intermediate data 404(2) may have a dimensionality of 6×7×1280.

The second intermediate data 404(2) is processed by an average pool and linear layer 406(1). Output from the average pool and linear layer 406(1) is provided to a loss module 408(1). The loss module 408(1) implements a loss function and determines a confidence loss value 410(1) that is associated with the global patch. The loss module 408 may use the identification data 136 or other labels that are associated with the processed image data 134 during calculation of the confidence loss value 410.

Returning to the patch extraction module 146, the global feature map data 144 is processed to determine a plurality of patch feature map data 148(1), 148(2), . . . , 148(X). The patch feature map data 148 comprises a portion or subset of the global feature map data 144. In some implementations, each patch feature map data 148 may overlap another patch feature map data 148. For example, the patch overlap 192 may be such that more than 25% of the patch feature map data 148(1) corresponding to a first patch 190(1) is the same as patch feature map data 148(2) corresponding to a second patch 190(2). In one implementation, each patch 190 may comprise one-quarter of the global feature map data 144. The dimensionality of the patch feature map data 148 is less than the dimensionality of the global feature map data 144. For example, if the global feature map data 144 has dimensionality of 24×28×1280, the patch feature map data 148 may have a dimensionality of 12×14×1280.

In another implementation, except for the global patch, the plurality of patch feature map data 148(1)-(X) do not overlap. For example, each patch feature map data 148 may comprise a subset of the global feature map data 144 that does not contain the same data as another patch feature map data 148.

Each patch feature map data 148(1)-(X) is processed in similar fashion. The patch feature map data 148 is provided as input to an inverted residual block 402. Output from the inverted residual block 402 comprises intermediate data 404 that is provided to an average pool and linear layer 406. A loss module 408 then determines a confidence loss value 410 associated with the patch 190. For example, the patch feature map data 148(1) is provided as input to a third inverted residual block 402(3). The third inverted residual block 402(3) determines third intermediate data 404(3). The third intermediate data 404(3) has a lower dimensionality than the patch feature map data 148. For example, given a patch feature map data 148 having a dimensionality of 12×14×1280, the third intermediate data 404(3) may have a dimensionality of 6×7×1280. The third intermediate data 404(3) is provided as input to the average pool and linear layer 406(2). Output from the average pool and linear layer 406(2) is used by the loss module 408(2) to determine a confidence loss value 410(2) that is associated with the patch 190.

The loss modules 408(1)-(X) may use the identification data 136 or other labels that are associated with the processed image data 134 during calculation of the respective confidence loss values 410(1)-X).

In the implementation described that modifies the MobileNetV2, the backbone of the network is truncated before the average pool layer, producing the global feature map data 144 with the desired dimensionality. The first inverted residual block 402(1) and the second inverted residual block 402(2) serve to downsample the global feature map data 144. Average pooling may be performed to reduce the embedding vector dimensionality to the desired value, such as 1280 in this example. The embedding network module 140 may utilize a fully connected layer that further reduces the dimensionality from 1280, providing embedding vector data 160 with a desired dimensionality of 1280.

The loss module(s) 408 may utilize the confidence-aware identification loss function described by Shi. (See section 3.1 of "Towards Universal Representation Learning for Deep Face Recognition," Shi, Yichun, et al, arXiv 2002.11841.) In particular, Equation 4 of Shi describes such a confidence aware loss function. This is shown below as Equation 1. Given sample i, j is the identity, $f_i$ is the feature embedding of the $i^{th}$ sample, and the $j^{th}$ identity protype vector is denoted as $w_j$ the confidence aware identification loss may be expressed as follows:

$$\mathcal{L}'_{idt} = -\log \frac{\exp(s_i w_{y_i}^T f_i - m)}{\exp(s_i w_{y_i}^T f_i - m) + \sum_{j \neq y_i} \exp(s_i w_j^T f_i)}$$

where:

$s_i$ is the sample-specific confidence, $y_i$ is the ground-truth label, m is the margin parameter, T is the event being observed.
(Equation 1)

The confidence loss values 410(1)-(X) may be considered to be confidence values that are indicative of likelihood that information associated with a respective patch is indicative of an identity. During the training process, the use of the patch-wise confidence aware loss has the effect of shifting the prototype $w_j$ closer to the higher quality samples i during training. This results in the learned prototype being closer in the vector space to those samples that are representative of identity j. As a result, training using the patch-wise confidence aware identification loss results in trained network data 158 that emphasizes those patches that are better able to provide embedding vector data 160 that readily distinguishes one user from another.

The confidence loss values 410(1)-(X) are provided to a loss consolidation module 420. For example, the loss consolidation module 420 may calculate the consolidated confidence loss value 152 as a weighted sum of the confidence loss values 410(1)-(X). The classification layers 154 may include a loss layer 156. The consolidated confidence loss value 152 may be utilized by the loss layer 156 during training.

With respect to the MobileNetV2 architecture, the architecture shown here may be truncated before an average pooling layer to produce the global feature map data 144 with desired dimensionality. For example, given an input image having a resolution of 768×896 pixels, the global feature map data 144 may have a dimensionality of 24×28×1280.

One or more portions of the embedding network module 140 may operate in parallel. For example, the patch-wise confidence aware layer 150 may operate in parallel, with the confidence loss values 410(1)-(X) being determined in parallel with one another.

By using the techniques and system described herein, confidence loss values 410 are determined that are representative of patch feature map data 148, that corresponds to a particular spatial portion of the global feature map data 144, that further corresponds to the particular spatial portion of the processed image data 134 or other input. Instead of a sub-embedding that comprises information with respect to one or more dimensions across the entirety of the global feature map data 144, the confidence loss value 410 provides information that is associated with a particular portion of the processed image data 134 or other input.

Figure 5:
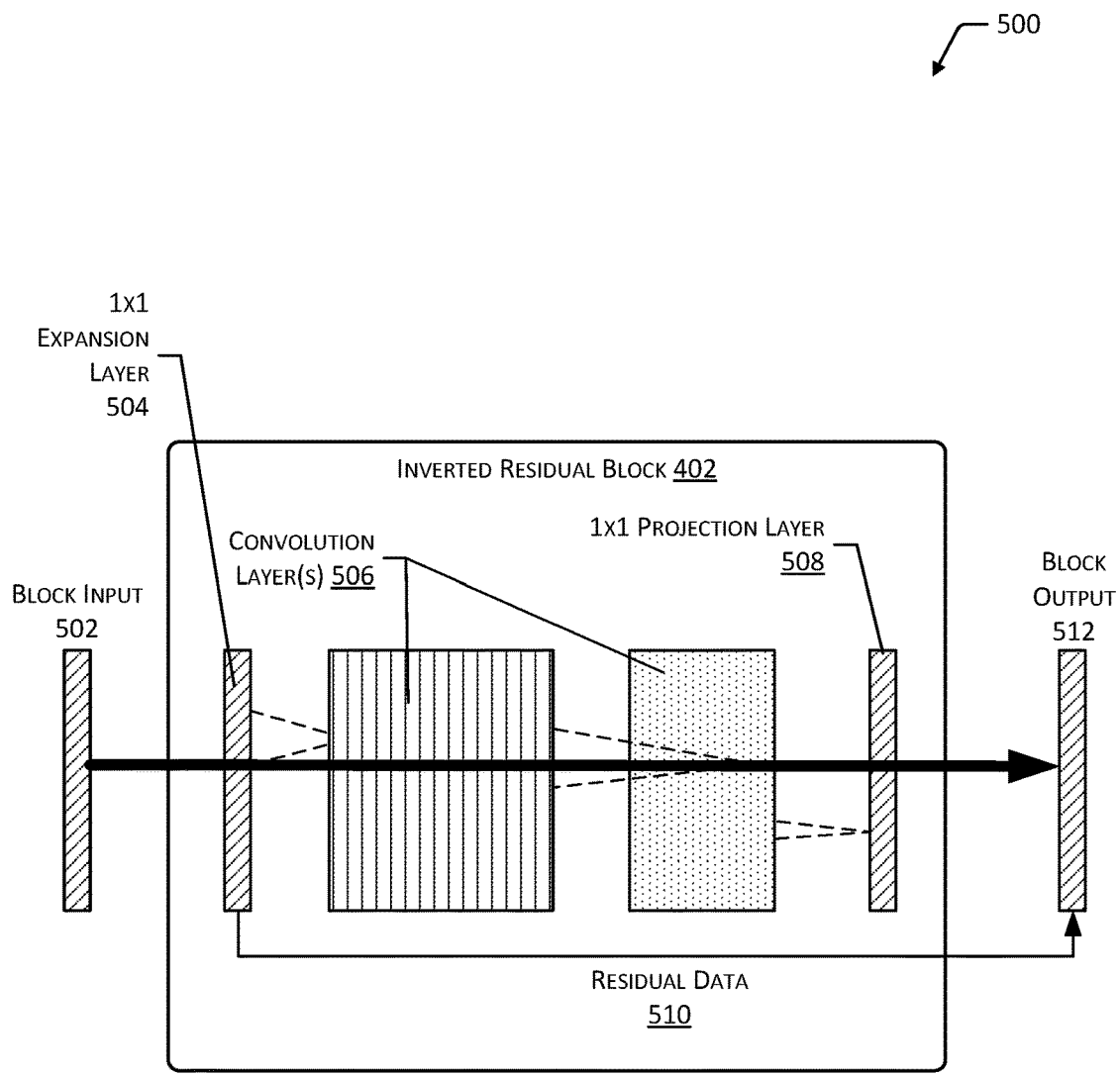
FIG. 5 is a block diagram of an inverted residual block, according to some implementations.

FIG. 5 is a block diagram 500 of an inverted residual block 402, according to some implementations. For example, the inverted residual block 402 may comprise a portion of the MobileNetV2 architecture. Block input 502 to the inverted residual block 402 is processed by a 1×1 expansion layer 504. Output from the 1×1 expansion layer 504 is then processed by one or more convolution layers 506. Output from the convolution layers 506 is processed by a 1×1 projection layer 508 to produce the block output 512. Residual data 510 also generated by the 1×1 expansion layer 504 is also included in the block output 512.

Figure 6:
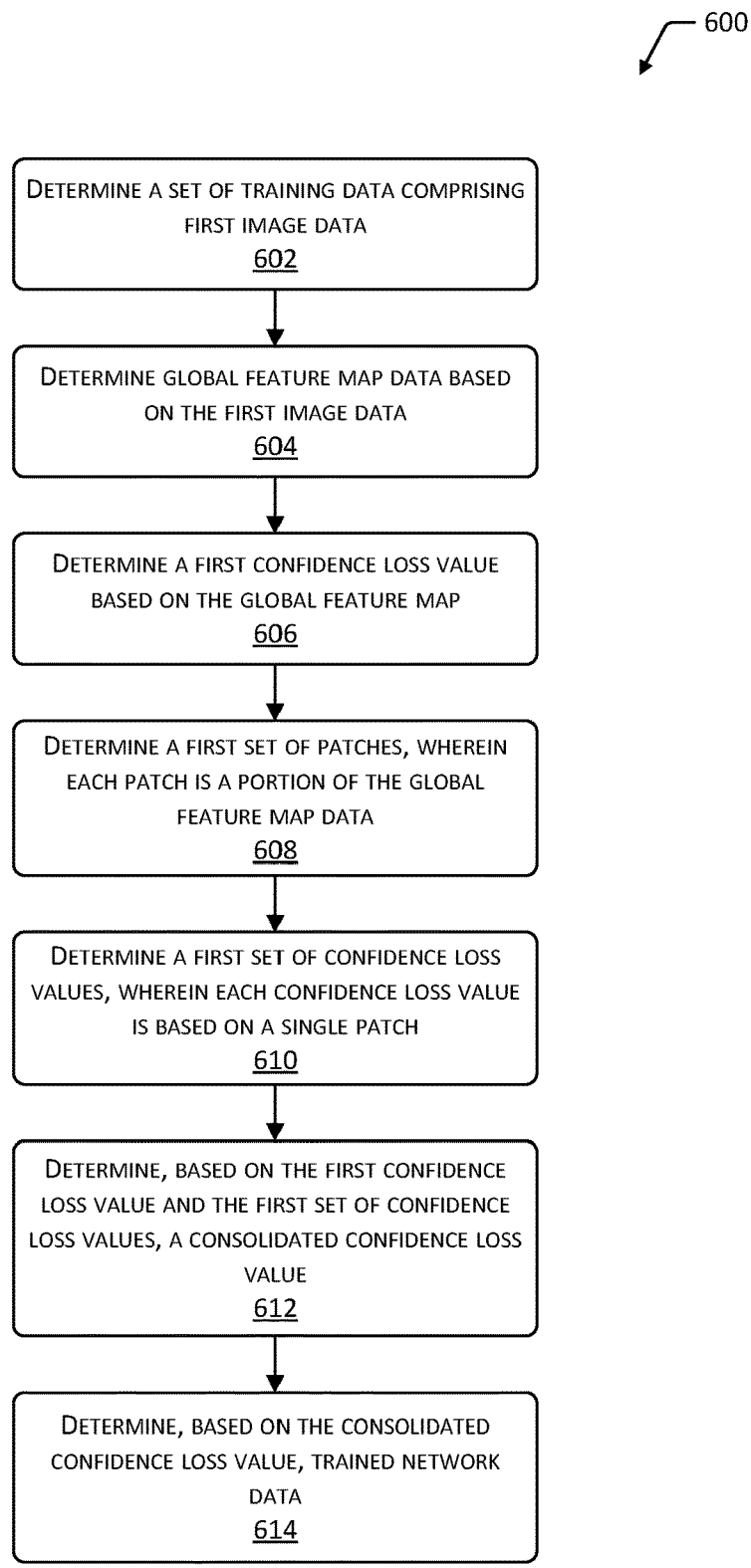
FIG. 6 is a flow diagram of a process to train a neural network using patch-wise confidence loss values, according to some implementations.

FIG. 6 is a flow diagram 600 of a process to train a neural network using patch-wise confidence loss values, according to some implementations. At 602, a first set of training data 132 comprising first image data is determined. For example, the training data module 130 may be used to provide processed image data 134(1)-(N) and associated label information such as identification data 136(1)-(P).

At 604 global feature map data 144 is determined based on the first image data. For example, the feature layers 142 comprising one or more convolutional layers 506 may be used to determine the global feature map data 144 based on the first image data.

At 606 a first confidence loss value 410 is determined based on the global feature map data 144. For example, the confidence loss value 410(1) that is representative of the global patch may be calculated by processing the first intermediate data 404(1). The first intermediate data 404(1) may be determined by processing the global feature map data 144 with inverted residual blocks 402(1) and 402(2).

At 608, a first set of patches 190 are determined, with each patch 190 comprising a portion of the global feature map data 144. For example, the patch extraction module 146 may create a plurality of patch feature map data 148(1)-(X). In one implementation, with the exception of the global patch, the feature map data associated with every patch 190 overlaps at least one other patch 190.

At 610 a first set of confidence loss values 410 are determined. The patch feature map data 148(1)-(X) for each patch 190 is processed using respective single inverted residual blocks 402(3)-(X). The resulting intermediate data 404(3)-(X) from each of the inverted residual blocks 402 may then be processed by a respective average pool and linear layer 406(2)-(X), with the output then being processed by the respective loss modules 408(2)-(X) to determine the confidence loss values 410(2)-(X).

At 612 the consolidated confidence loss value 152 is determined based on the first confidence loss value 410(1) and the first set of confidence loss values 410(2)-(X). For example, a sum, a weighted sum, or an average of the confidence loss values 410(1)-(X) may be calculated.

At 614, based on the consolidated confidence loss value 152, the trained network data 158 is determined. For example, based on the consolidated confidence loss value 152 and the subsequent iterations of the embedding network module 140 during training, the trained network data 158 may be calculated.

Figure 7:
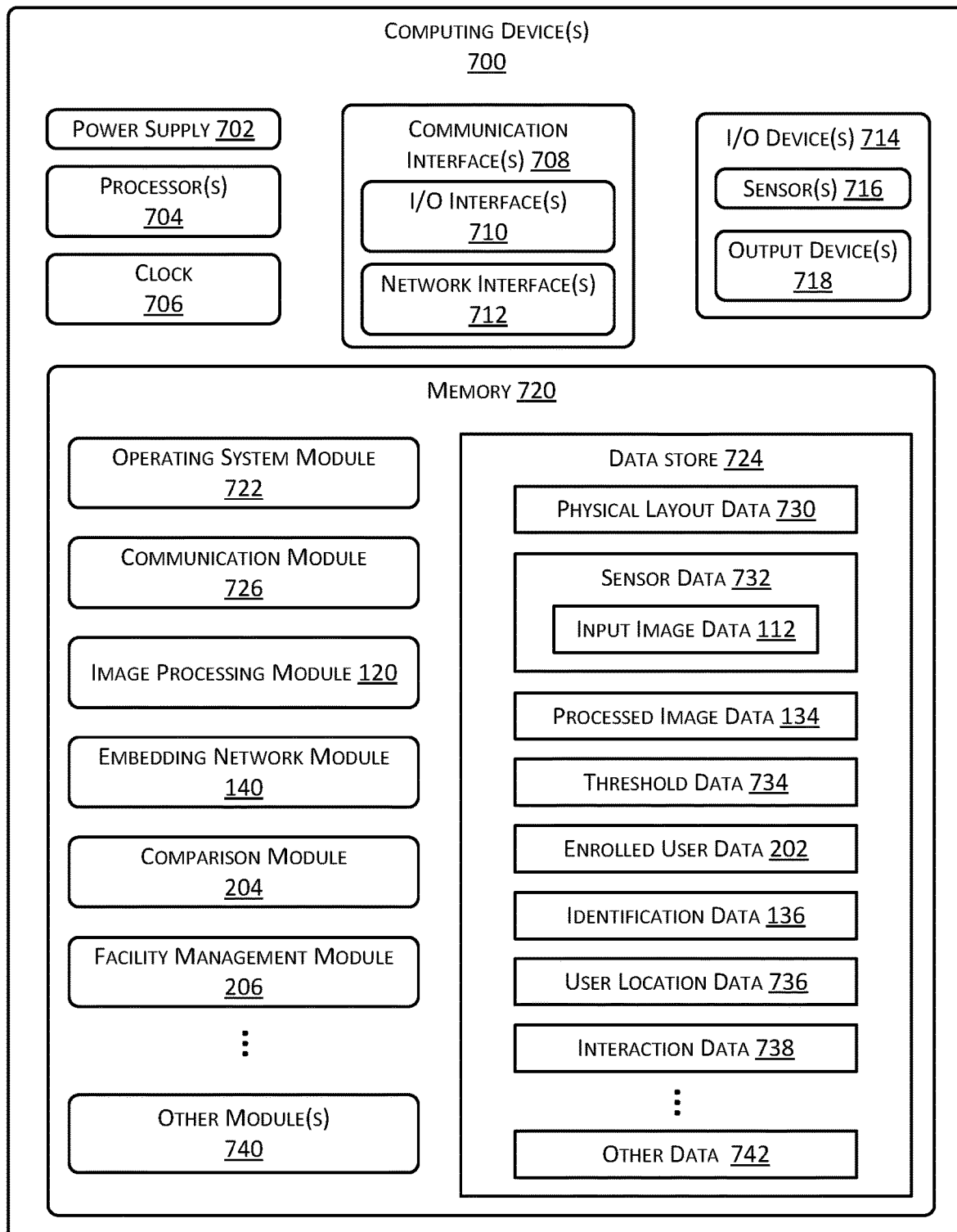
FIG. 7 is a block diagram of a computing device to use to train a neural network to determine embedding vector data, according to some implementations.

FIG. 7 is a block diagram of a computing device 700 to use to train a neural network, or use the trained neural network, to determine embedding vector data 160, according to some implementations.

The computing device 700 may be within the scanner 104, may comprise a server, and so forth. The computing device 700 may be physically present at the facility, may be accessible by a network, or a combination of both. The computing device 700 does not require end-user knowledge of the physical location and configuration of the system that delivers the services. Common expressions associated with the computing device 700 may include "embedded system", "on-demand computing", "software as a service (SaaS)", "platform computing", "network-accessible platform", "cloud services", "data centers", and so forth. Services provided by the computing device 700 may be distributed across one or more physical or virtual devices.

One or more power supplies 702 may be configured to provide electrical power suitable for operating the components in the computing device 700. The one or more power supplies 702 may comprise batteries, capacitors, fuel cells, photovoltaic cells, wireless power receivers, conductive couplings suitable for attachment to a power source such as provided by an electric utility, and so forth. The computing device 700 may include one or more hardware processors 704 (processors) configured to execute one or more stored instructions. The processors 704 may comprise one or more cores. One or more clocks 706 may provide information indicative of date, time, ticks, and so forth. For example, the processor 704 may use data from the clock 706 to associate a particular interaction with a particular point in time.

The computing device 700 may include one or more communication interfaces 708 such as input/output (I/O) interfaces 710, network interfaces 712, and so forth. The communication interfaces 708 enable the computing device 700, or components thereof, to communicate with other devices or components. The communication interfaces 708 may include one or more I/O interfaces 710. The I/O interfaces 710 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 710 may couple to one or more I/O devices 714. The I/O devices 714 may include input devices such as one or more of a sensor 716, keyboard, mouse, scanner, and so forth. The I/O devices 714 may also include output devices 718 such as one or more of a display device, printer, audio speakers, and so forth. In some embodiments, the I/O devices 714 may be physically incorporated with the computing device 700 or may be externally placed.

The network interfaces 712 may be configured to provide communications between the computing device 700 and other devices, such as scanners 104, routers, access points, and so forth. The network interfaces 712 may include devices configured to couple to personal area networks (PANS), local area networks (LANs), wireless local area networks (WLANS), wide area networks (WANs), and so forth. For example, the network interfaces 712 may include devices compatible with Ethernet, Wi-Fi, Bluetooth, Zig-Bee, and so forth.

The computing device 700 may also include one or more buses or other internal communications hardware or software that allow for the transfer of data between the various modules and components of the computing device 700.

As shown in FIG. 7, the computing device 700 includes one or more memories 720. The memory 720 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 720 provides storage of computer-readable instructions, data structures, program modules, and other data for the operation of the computing device 700. A few example functional modules are shown stored in the memory 720, although the same functionality may alternatively be implemented in hardware, firmware, or as a system on a chip (SoC).

The memory 720 may include at least one operating system (OS) module 722. The OS module 722 is configured to manage hardware resource devices such as the I/O interfaces 710, the I/O devices 714, the communication interfaces 708, and provide various services to applications or modules executing on the processors 704. The OS module 722 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 720 may be a data store 724 and one or more of the following modules. These modules may be executed as foreground applications, background tasks, daemons, and so forth. The data store 724 may use a flat file, database, linked list, tree, executable code, script, or other data structure to store information. In some implementations, the data store 724 or a portion of the data store 724 may be distributed across one or more other devices including the computing devices 700, network attached storage devices, and so forth.

A communication module 726 may be configured to establish communications with one or more of the scanners 104, sensors 716, display devices, other computing devices 700, or other devices. The communications may be authenticated, encrypted, and so forth.

The memory 720 may also store one or more of the image processing module 120, the embedding network module 140, or the comparison module 204, as described above.

The memory 720 may store the facility management module 206. The facility management module 206 may perform various functions, such as tracking items between different inventory locations, to and from carts, generating restocking orders, directing operation of robots within the facility, using the identification data 136 to associate a particular user identity with a user in the facility, and so forth. During operation, the facility management module 206 may access sensor data 732 such as one or more of image data from cameras, weight data from weight sensors, and so forth.

Information used by the facility management module 206 may be stored in the data store 724. For example, the data store 724 may be used to store physical layout data 730, sensor data 732, enrolled user data 202, identification data 136, user location data 736, interaction data 738, and so forth.

The physical layout data 730 may provide information indicative of where scanners 104, cameras, weight sensors, antennas for radio receivers, inventory locations, and so forth are in the facility with respect to one another. For example, the physical layout data 730 may comprise information representative of a map or floor plan of the facility with relative positions of gates with scanners 104 and inventory locations.

The sensor data 732 may comprise information obtained from one or more of the sensors 716 in or associated with the facility.

The enrolled user data 202 may comprise the embedding vector data 160 that is associated with particular user accounts. For example, the enrolled user data 202 may comprise first embedding vector data 160 for user "Bob", second embedding vector data 160 for user "Pat", and so forth.

The facility management module 206 may generate the user location data 736 that is indicative of the location of the user within the facility. For example, the facility management module 206 may use image data obtained by the cameras to determine a location of the user. In other implementations, other techniques may be used for determining the user location data 736. For example, data from a smart floor may be used to determine the location of the user.

A user identity may be associated with the user location data 736 based on the identification data 136. For example, the user enters the facility and has their palm scanned, producing identification data 136 that is indicative of their time of entry, a scanner 104 associated with where they entered, and their user identifier. The user location data 736 indicative of a path of a user that begins at the scanner 104 at the time of entry may be associated with the user identifier in the identification data 136.

Based on the user location data 736 and the interaction data 738, a particular interaction may be associated with an account of a particular user. For example, if the user location data 736 indicates that the user is present in front of inventory location 492 at time 13:47:20 and the interaction data 738 indicates a pick of a quantity of one item from an area on inventory location 492 at 13:47:27, the user may be billed for that pick.

The facility management module 206 may use the sensor data 732 to generate the interaction data 738. The interaction data 738 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 206 may generate interaction data 738 that indicates what item the user picked from a particular lane on a shelf, and then use this interaction data 738 to adjust the count of inventory stowed at that lane. The interaction data 738 may then be used to bill an account associated with the user identifier that is associated with the user who picked the item.

The facility management module 206 may process the sensor data 732 and generate output data. For example, based on the interaction data 738, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 740 may also be present in the memory 720 as well as other data 742 in the data store 724. For example, a billing module may use the interaction data 738 and the identification data 136 to bill an account associated with a particular user.

The devices and techniques described in this disclosure may be used in a variety of other settings. For example, the system may be used in conjunction with a point-of-sale (POS) device. The user may present their hand 102 to a scanner 104 to provide an indication of intent and authorization to pay with an account associated with the identification data 136. In another example, a robot may incorporate a scanner 104. The robot may use the identification data 136 to determine whether to deliver a parcel to the user, and based on the identification data 136, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a memory storing computer-executable instructions; and
one or more hardware processors to execute the computer-executable instructions to:
  determine a set of training data comprising first image data;
  determine, based on the first image data, first data using a convolutional neural network (CNN) comprising a plurality of nodes;
  process the first data using a first inverted residual block to determine first intermediate data;
  process the first intermediate data using a second inverted residual block to determine second intermediate data;
  determine a first value based on the second intermediate data;
  determine a first set of patches, wherein each patch is a portion of the first data;
  determine a first set of values comprising second values, wherein each second value in the first set of values is associated with a specified patch in the first set of patches;
  determine, based on the first value and the first set of values, a third value; and
  determine, based on the third value, second data comprising one or more weights that are associated with specified ones of the plurality of nodes.

2. The system of claim 1, wherein:
the first value is indicative of confidence values indicative of a likelihood that information associated with a respective patch is indicative of an identity, and
the second values in the first set of values are indicative of confidence values indicative of a likelihood that information associated with a respective patch is indicative of an identity.

3. The system of claim 1, wherein the each patch in the first set of patches overlaps at least one other patch in the first set of patches.

4. The system of claim 1, the one or more hardware processors to further execute the computer-executable instructions to:
process the portion of the first data that is associated with a patch of the first set of patches using a third inverted residual block to determine third intermediate data; and
determine, based on the third intermediate data, a second value in the first set of values that is associated with the patch.

5. The system of claim 1, the one or more hardware processors to further execute the computer-executable instructions to:
determine a first sum of the first value and the first set of values; and
determine the third value based on the first sum.

6. The system of claim 1, wherein the first image data comprises one or more of:
a first image of a first palm acquired using a first modality, or
a second image of the first palm acquired using a second modality.

7. The system of claim 1, wherein:
the first data has:
a first size with respect to a first dimension,
a second size with respect to a second dimension, and
a third size with respect to a third dimension; and
the each patch has:
a fourth size that is at least one half the first size,
a fifth size that is at least one half the second size, and
a sixth size that is equal to the third size.

8. The system of claim 1, wherein the first image data comprises one or more images having a resolution of at least 512 vertical pixels and 512 horizontal pixels.

9. The system of claim 1, wherein the first image data comprises one or more images of hands, each hand depicted in one or more of:
a predetermined pose relative to a scanner,
a predetermined articulation,
a predetermined illumination, or
a predetermined scale.

10. A computer-implemented method comprising:
determining a set of training data comprising first image data;
determining, based on the first image data, first data using a convolutional neural network (CNN) comprising a plurality of nodes;
determining a first value based on the first data;
determining a first set of patches, wherein each patch is a portion of the first data;
processing the portion of the first data that is associated with a patch of the first set of patches using a first inverted residual block to determine first intermediate data;
determining, based on the first intermediate data, a second value for the each patch in the first set of patches;
determining a first set of values comprising the second values for the each patch in the first set of patches;
determining, based on the first value and the first set of values, a third value; and
determining, based on the third value, second data comprising one or more values of one or more parameters that are associated with a specified one of the plurality of nodes.

11. The method of claim 10, wherein:
the first value is indicative of confidence values indicative of a likelihood that information associated with a respective patch is indicative of an identity, and
the first set of values are indicative of confidence values indicative of a likelihood that information associated with a respective patch is indicative of an identity.

12. The method of claim 10, wherein the each patch in the first set of patches overlaps at least one other patch in the first set of patches.

13. The method of claim 10, further comprising:
processing the first data using a second inverted residual block to determine second intermediate data;
processing the second intermediate data using a third inverted residual block to determine third intermediate data; and
determining, based on the third intermediate data, the first value.

14. The method of claim 10, wherein the first image data comprises one or more of:
a first image of a first palm acquired using a first modality, or
a second image of the first palm acquired using a second modality.

15. The method of claim 10, wherein:
the first data has:
a first size with respect to a first dimension,
a second size with respect to a second dimension, and
a third size with respect to a third dimension; and
the each patch has:
a fourth size that is at least one-quarter the first size,
a fifth size that is at least one-quarter the second size, and
a sixth size that is equal to the third size.

16. A system comprising:
a memory storing computer-executable instructions; and
one or more hardware processors to execute the computer-executable instructions to:
determine a set of training data comprising first image data;
determine, based on the first image data, first data using a convolutional neural network (CNN) comprising a plurality of nodes;
process the first data using a first inverted residual block to determine first intermediate data;
process the first intermediate data using a second inverted residual block to determine second intermediate data;
determine a first value based on the second intermediate data;
determine a first set of patches, wherein each patch is a portion of the first data;
determine a first set of values comprising second values, wherein each second value is based on a single patch of the first set of patches;
determine, based on the first value and the first set of values, a third value; and determine, based on the third value, second data comprising one or more values associated with specified ones of the plurality of nodes.

17. The system of claim 16, wherein the first image data is representative of a palm of a hand acquired using one or more modalities.

18. The system of claim 16, wherein the each patch in the first set of patches overlaps at least one other patch in the first set of patches.

19. The system of claim 16, wherein:
the first value is indicative of confidence values indicative of a likelihood that information associated with a respective patch is indicative of an identity, and
the second values in the first set of values are indicative of confidence values indicative of a likelihood that information associated with a respective patch is indicative of an identity.

20. The system of claim 16, the one or more hardware processors to further execute the computer-executable instructions to:
determine a first sum of the first value and the first set of values; and
determine the third value based on the first sum.

* * * * *